C. I. SHIRLEY.
ROLLER BEARING.
APPLICATION FILED JULY 16, 1908.
924,387.
Patented June 8, 1909.
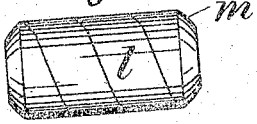
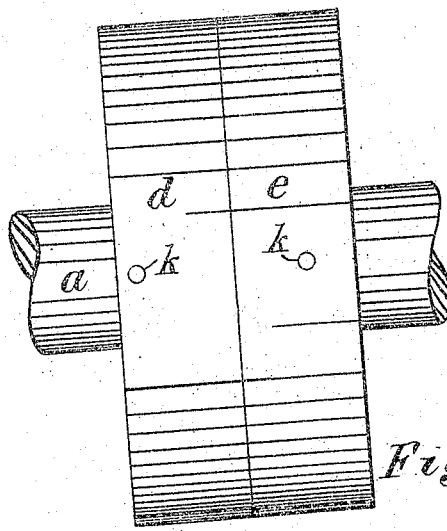
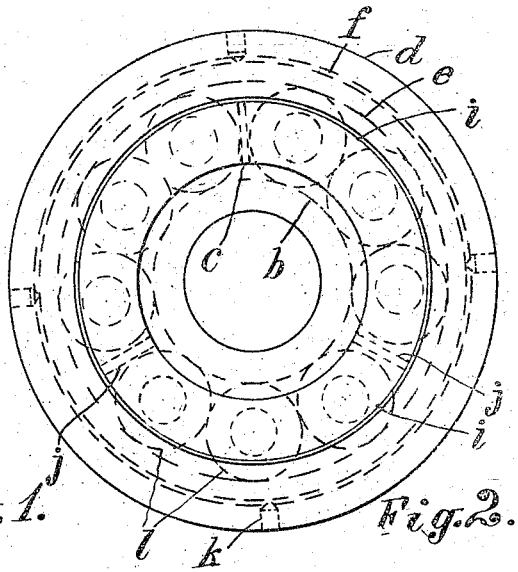
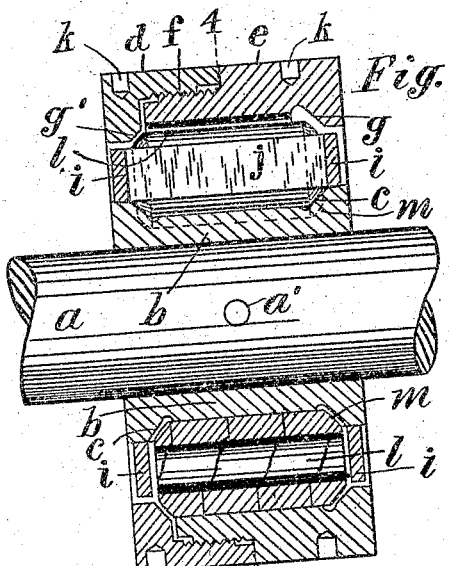
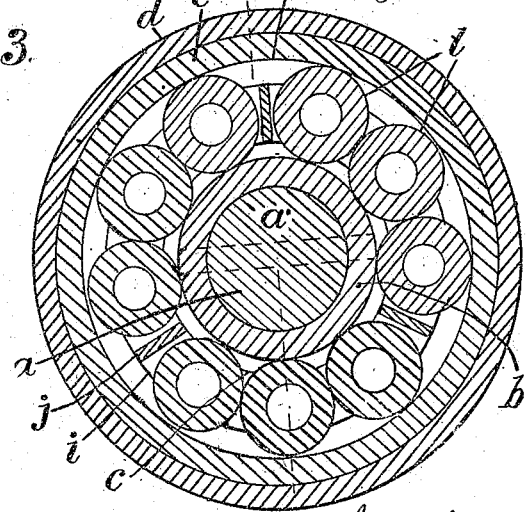

UNITED STATES PATENT OFFICE.

CEPHAS I. SHIRLEY, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING.

No. 924,387.

Specification of Letters Patent.

Patented June 8, 1909.

Application filed July 16, 1908. Serial No. 443,859.

*To all whom it may concern:*

Be it known that I, CEPHAS I. SHIRLEY, a citizen of the United States, residing at 114 Stone street, Newark, county of Essex, and State of New Jersey, have invented certain new and useful Improvements in Roller-Bearings, fully described and represented in the following specification and the accompanying drawings, forming a part of the same.

The object of the present invention is to furnish a cheap and simple construction for a roller bearing in which the rolls are enabled not only to sustain the lateral strain, but also in some degree to resist the end thrust. Where the bearing is intended to support a shaft with a very heavy end thrust a thrust-bearing of special construction is required; but the present bearing is not intended for such purpose, but only to prevent a shaft from longitudinal displacement, or to resist any slight tendency to end movement in the shaft, and is especially adapted for hollow or spirally wound rolls which can only be tapered or made conical upon their periphery.

The construction includes a spool attached to the shaft and having bevel heads on its ends, rolls fitted to the body of the spool and having conical ends fitted to such heads, and a casing having seat fitted to the outer sides of the rolls and having beveled flanges to embrace the conical ends of the rolls, the flanges and the heads of the spool resisting end thrust upon the shaft when the casing is held stationary. The effect is the same if the shaft and spool be held stationary and the casing be made the part which is subjected to lateral and longitudinal pressure. Owing to the beveled flanges formed upon the ends of the casing, it must be divided transversely to apply it to the rolls, and the two parts are shown herein connected by a threaded joint.

The invention will be understood by reference to the annexed drawing, in which—

Figure 1 is a side view of the roller bearing with piece of a shaft therein; Fig. 2 is an end view of the bearing; Fig. 3 is a longitudinal section on line 3—3 in Fig. 4, with the shaft in the bearing; Fig. 4 is a section on line 4—4 in Fig. 3; Fig. 5 is a side elevation of one of the rolls formed of a spirally wound strip.

$a$ designates the shaft, $b$ a cylindrical spool secured thereon, as by the transverse pin $a'$. The spool has annular heads $c$ upon the ends formed each with a beveled or conical seat upon its inner side.

The rolls $l$ are made cylindrical of suitable length to fit the cylindrical surface of the spool, and the ends $m$ tapered and slightly rounded to form convex conical surfaces which are embraced by the heads upon the spool and prevent the rolls from any material longitudinal movement. The spirally wound rolls are shown in Figs. 3 and 5, but the thickness of such rolls outside of the central bore is sufficient to form the conical surface. The conical ends of the rolls are made slightly rounded or convex to reduce the area of contact with the spool heads. A casing surrounds the rolls, being formed of the parts $d$ and $e$ connected by thread $f$. The part $e$ has a cylindrical seat $d'$ to fit the outer sides of the rolls, and a beveled flange $g$ to fit one end of the rolls. The part $d$ has the beveled flange $g'$, and a tubular body threaded internally to screw upon the part $d$, which has a shoulder $h$ to meet the end of such tubular body and adjust the beveled flanges $g$ and $g'$ at the same distance apart as the beveled seats upon the heads of the spool. The rolls are guided in their movement around the spool by a cage formed of two rings $i$ connected by radial tie-bars $j$, the rolls lying loosely between the tie-bars and carrying the cage around with them as they rotate between the spool and casing. The casing is divided to facilitate the assembling of the parts composing the bearing, which is effected by first slipping the cage of the guide over the spool, as shown in Figs. 3 and 4, then placing the rolls between the tie-bars $j$, and finally applying the two parts of the casing to the opposite ends of the rolls and connecting them together by the screw-thread $f$. Holes $k$ are shown in the periphery of each of these parts for the application of a spanner or wrench to screw the parts tightly together.

The bearing is manufactured with the spool casing and the intermediate parts, and the spool is applied to the shaft by the user and the casing secured to any part intended to rotate around the shaft.

Fig. 5 shows one of the rolls formed of a spirally wound strip, the roll, therefore, being hollow and the ends dressed to the required convex conical shape.

Having thus set forth the nature of the invention what is claimed herein is:

In a roller bearing, the combination, with a spool attached to the shaft and having integral beveled heads at its ends, of spirally wound tubular rolls fitted to the body of the spool and having conical ends to fit the flaring heads, a transversely divided casing having a cylindrical seat fitted at the outer sides of the rolls and having integral beveled flanges to engage the conical ends of the rolls, and a cage rotating with the rolls to hold them parallel within the casing.

In testimony whereof I have hereunto set my hand in the presence of two subscribing witnesses.

CEPHAS I. SHIRLEY.

Witnesses:
 ALFRED P. SLOARCH,
 CLIFFORD PARSHALL.